A. S. HICKLEY.
ELECTROLYTIC ALTERNATING CURRENT RECTIFIER.
APPLICATION FILED JAN. 16, 1908.
900,279.
Patented Oct. 6, 1908.
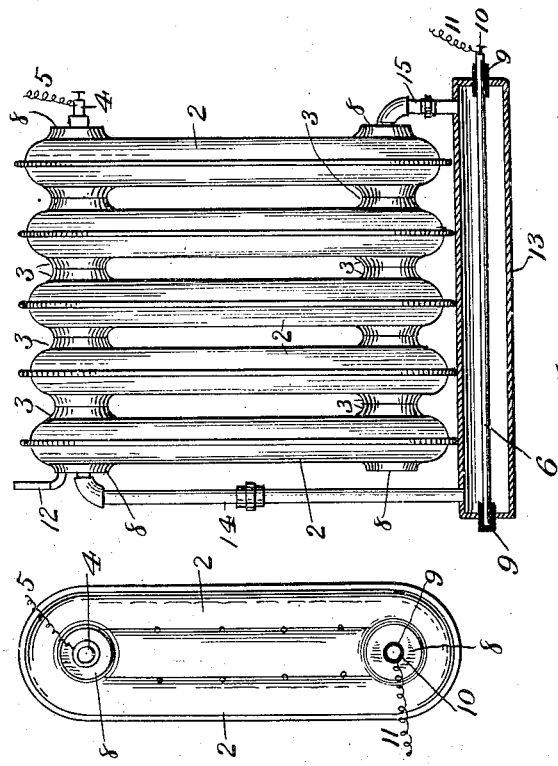
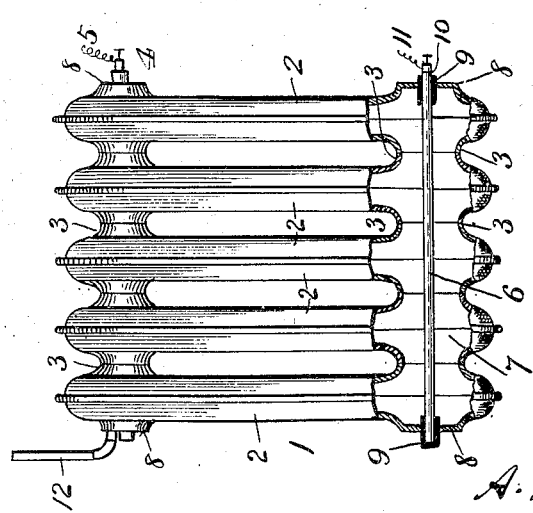
Witnesses
F. L. Ourand
W. Parker Reinohl
Inventor
A. S. Hickley.
By D. C. Reinohl
Attorney

UNITED STATES PATENT OFFICE.

ARTHUR S. HICKLEY, OF MANASQUAN, NEW JERSEY.

ELECTROLYTIC ALTERNATING-CURRENT RECTIFIER.

No. 900,279.   Specification of Letters Patent.   Patented Oct. 6, 1908.

Application filed January 16, 1908. Serial No. 411,174.

*To all whom it may concern:*

Be it known that I, ARTHUR S. HICKLEY, a subject of the King of Great Britain, residing at Manasquan, in the county of Monmouth and State of New Jersey, have invented certain new and useful Improvements in Electrolytic Alternating - Current Rectifiers; and I do hereby declare the following to be a full, clear, and exact description of the invention, such as will enable others skilled in the art to which it appertains to make and use the same.

My invention relates primarily to electrolytic cells, has especial reference to such cells which are used for transforming alternating-currents, as shown in Letters-Patent of the United States, granted to me, June 30th, 1907, and numbered 861,281 and 861,282.

The invention has for its object the prevention of undue heating of the electrolyte and the active electrode by the more perfect circulation of the electrolyte, and the invention consists in certain improvements in construction, which will be fully disclosed in the following specification and claims.

In the practical operation of my invention, I have discovered that when currents of high amperage are passed through the cell, the heated electrolyte, produced by the rectifying of the current at the active or aluminum electrode, rises to the top of the cell or plurality of cells, where it is liable to stagnate, instead of circulating in the cell and the hollow members thereof. To provide against this condition of the electrolyte occurring, I arrange the active electrode in an approximately horizontal position at or near the bottom of the cell, a plurality of cells, or the hollow members, when used as cells, and the active electrode is preferably extended into the wall or walls of the cell, or the hollow members forming the cell.

When the active electrode is placed in this position, the heat developed at that electrode heats the electrolyte which is in direct contact therewith causing the heated portion of the electrolyte to rise, and the cooler portion of the electrolyte to descend and take its place, thereby effecting perfect circulation of the electrolyte in the cell, a plurality of cells, or hollow members forming the cell.

In the accompanying drawings, which form part of this specification:—Figure 1 represents a side elevation, partly in section of an electrolytic cell embodying my invention. Fig. 2 an end elevation of the same, and Fig. 3 a side elevation partly in section of a modified construction of the cell.

Reference being had to the drawings, and the designating characters thereon, the numeral 1 indicates an electrolytic cell composed of a plurality of metallic vertical parallel hollow members 2, properly joined together at 3, in the usual manner of constructing radiators. The hollow members 2 form the non-active electrode, and to which a binding post 4 is secured for connecting wire 5.

6 indicates the active electrode, of aluminum, or one of its alloys, and extends through the enlarged chamber 7 of the cell, formed by the connecting members 3, and is supported in the end walls 8, 8 of the cell, and is properly insulated at 9, 9, as shown, and on one end of the electrode 6, is a binding post 10 for connecting wire 11. The insulators 9 in practice, are supported in stuffing boxes, not shown.

In the construction shown in Fig. 3, a cell 13, is shown separate from the hollow members 2, but connected therewith by pipes 14 and 15, at opposite ends of the cell, by which circulation of the electrolyte is maintained through all the hollow members 2 and the cell 13.

The cell having been filled with a suitable electrolyte, not shown, through pipe 12, which also serves as a vent and connected to the apparatus to be charged; the alternating electric current being turned on in the usual manner, is rectified within the cell, and the electrode 6, becoming heated, disposes of its heat to the electrolyte, which commences to rise and circulate throughout the cell, a plurality of cells, or all the hollow members 2 of the cell shown, and produces perfect circulation of the electrolyte, by the cooler portion thereof descending as the heated portion ascends, and thereby prevents undue heating of the electrolyte.

Changes in details of construction may be made without departing from the spirit of my invention.

Having thus fully described my invention, what I claim is

1. An electrolytic cell for alternating-current rectifiers having an active electrode extending across the cell near the bottom and through one wall thereof.

2. An electrolytic cell for alternating current rectifiers, having an active electrode submerged in, extending across the cell near the bottom thereof and supported in the wall of the cell.

3. An electrolytic cell for alternating current rectifiers, having an active electrode extending across the cell near the bottom thereof and supported at both its ends in the wall of the cell.

4. An electrolytic cell for alternating current rectifiers composed of a plurality of hollow members, and an active electrode supported at its ends in the wall of the cell, and arranged to dispose of its heat to the electrolyte near the bottom of the cell.

5. An electrolytic cell for alternating-current rectifiers, composed of a plurality of hollow connected members having an active electrode submerged in and extending across the cell near the bottom thereof, and extending through one wall of the cell.

6. An electrolytic cell for alternating-current rectifiers, composed of a plurality of hollow connected members provided with a submerged active electrode arranged near the bottom and crossing the cell in an approximately horizontal plane, and of a length approximately equal to the length of the cell.

7. An electrolytic cell for alternating-current rectifiers, composed of a plurality of hollow members connected together in parallel planes and provided with a continuous chamber at the lower end of the cell, and an active electrode within said chamber to heat the electrolyte in circulation near the bottom of the cell.

8. An electrolytic cell for alternating-current rectifiers composed of a plurality of separate chambers in communication with each other, a chamber at the lower end of the cell in communication with the aforesaid chambers and through which the electrolyte from all the chambers circulates, and an active electrode in the lower chamber, in the path of and surrounded by the circulating electrolyte.

9. An electrolytic cell for alternating-current rectifiers, composed of a plurality of hollow members connected together in parallel planes, and an active electrode extending across all of said members and arranged to dispose of its heat to the electrolyte near the bottom of the cell, whereby the electrolyte is circulated through all of said members and undue heating thereof prevented.

10. An electrolytic cell for alternating current rectifiers, composed of a plurality of hollow members connected together in parallel planes, and an active electrode extending through all the members, and supported at its ends in the wall of the cell.

In testimony whereof I affix my signature, in presence of two witnesses.

ARTHUR S. HICKLEY.

Witnesses:
D. C. REINOHL,
W. PARKER REINOHL.